(12) United States Patent
Zhang

(10) Patent No.: US 11,234,302 B2
(45) Date of Patent: Jan. 25, 2022

(54) CONTROL CIRCUIT, DRIVING CIRCUIT AND CONTROL METHOD FOR CONTROLLING A TRANSISTOR

(71) Applicant: Xiamen Kiwi Instruments Corporation, Xiamen (CN)

(72) Inventor: Bo Zhang, Hangzhou (CN)

(73) Assignee: XIAMEN KIWI INSTRUMENTS CORPORATION, Xiamen (CN)

( * ) Notice: Subject to any disclaimer, the term of this patent is extended or adjusted under 35 U.S.C. 154(b) by 0 days.

(21) Appl. No.: 17/003,031

(22) Filed: Aug. 26, 2020

(65) Prior Publication Data

US 2020/0389956 A1     Dec. 10, 2020

(30) Foreign Application Priority Data

Aug. 27, 2019   (CN) .......................... 201910795308.2

(51) Int. Cl.
*H02M 1/00*  (2006.01)
*H05B 45/30*  (2020.01)

(52) U.S. Cl.
CPC .............. *H05B 45/30* (2020.01); *H02M 1/00* (2013.01); *H02M 1/0019* (2021.05)

(58) Field of Classification Search
CPC ......... H05B 45/00; H05B 45/30; H02M 1/00; H02M 1/0019; H02M 1/0016; H02M 1/0003

See application file for complete search history.

(56) References Cited

U.S. PATENT DOCUMENTS

| | | | |
|---|---|---|---|
| 8,860,325 B2 | 10/2014 | Chen | |
| 2017/0181234 A1* | 6/2017 | Huang | H05B 45/3725 |
| 2018/0295685 A1* | 10/2018 | Wang | H05B 45/395 |
| 2020/0214108 A1* | 7/2020 | Huang | H05B 45/10 |
| 2020/0404759 A1* | 12/2020 | Zhang | H05B 45/395 |

FOREIGN PATENT DOCUMENTS

CN           109526106 A       3/2019

* cited by examiner

*Primary Examiner* — Adolf D Berhane
(74) *Attorney, Agent, or Firm* — NZ Carr Law Office PLLC

(57) ABSTRACT

A control circuit for controlling a transistor includes a reference signal generating circuit and a driver stage circuit. The reference signal generating circuit outputs a reference signal, and to control the reference signal having a first change trend in a first time period of a time interval and having a second change trend in a second time period of the time interval based on time. The driver stage circuit is configured to control the transistor according to the reference signal and a current sampling signal, so that the current flowing through the transistor changes with the reference signal.

19 Claims, 4 Drawing Sheets

CONTROL CIRCUIT, DRIVING CIRCUIT AND CONTROL METHOD FOR CONTROLLING A TRANSISTOR

CROSS-REFERENCE TO RELATED APPLICATIONS

This application claims priority to and the benefit of Chinese Patent Application No. 201910795308.2 filed on Aug. 27, 2019, which is incorporated herein by reference in its entirety.

TECHNICAL FIELD

The present invention relates generally to electronic circuit, and more particularly but not exclusively relates to control circuit, driving circuit and control method for controlling a transistor.

BACKGROUND

LED driving circuits are mainly divided into groups of linear LED driving circuits and switch type LED driving circuits. The linear LED driving circuit has a relatively simple structure, fewer components and lower cost, which is compared with the switch type LED driving circuit. But the linear LED driving circuit is also inefficient.

SUMMARY

In one embodiment, a control circuit for controlling a transistor comprises: a reference signal generating circuit configured to output a reference signal, the reference signal generating circuit configured to control the reference signal having a first change trend in a first time period of a time interval and having a second change trend in a second time period of the time interval based on time, wherein the second time period occurs after the first time period in the same time interval, and the first change trend is opposite to the second change trend; and a driver stage circuit, having a first input, a second input, and an output, the first input of the driver stage circuit coupled to the reference signal generating circuit to receive the reference signal, the second input of the driver stage circuit configured to receive a current sampling signal representing the current flowing through the transistor, the output of the driver stage circuit coupled to a control end of the transistor, the driver stage circuit configured to control the transistor according to the reference signal and the current sampling signal, so that the current flowing through the transistor changes with the reference signal.

In another embodiment, a driving circuit for driving the load comprises a transistor and a control circuit for controlling the transistor, wherein the control circuit is coupled to a control end of the transistor to regulate the degree of conduction of the transistor; and the control circuit further comprises: a reference signal generating circuit configured to output a reference signal, the reference signal generating circuit configured to control the reference signal having a first change trend in a first time period of a time interval and having a second change trend in a second time period of the time interval based on time, wherein the second time period occurs after the first time period in the same time interval, and the first change trend is opposite to the second change trend; and a driver stage circuit, having a first input, a second input, and an output, the first input of the driver stage circuit coupled to the reference signal generating circuit to receive the reference signal, the second input of the driver stage circuit configured to receive a current sampling signal representing the current flowing through the transistor, the output of the driver stage circuit coupled to a control end of the transistor, the driver stage circuit configured to control the transistor according to the reference signal and the current sampling signal, so that the current flowing through the transistor changes with the reference signal.

In yet another embodiment, a control method for controlling a transistor comprises: controlling the reference signal having a first change trend in a first time period of a time interval, and controlling the reference signal having a second change trend in a second time period of the time interval, wherein the second time period occurs after the first time period in the same time interval, and the first change trend is opposite to the second change trend; and controlling the transistor according to the reference signal and a current sampling signal, so that the current flowing through the transistor changes with the reference signal.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments.

Same numeral or label in different figures illustrates same or similar component or circuit.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Throughout the specification and claims, the term "couple" as used herein, is defined as either directly, or indirectly connecting one to another via intermediary such as via electrical conducting materials which may have resistance, parasitic inductance or capacitance, or via other material(s) or component(s) as would be known to person skilled in the art without departure from the spirit and scope of the invention as defined by the appended claims.

Figure 1:
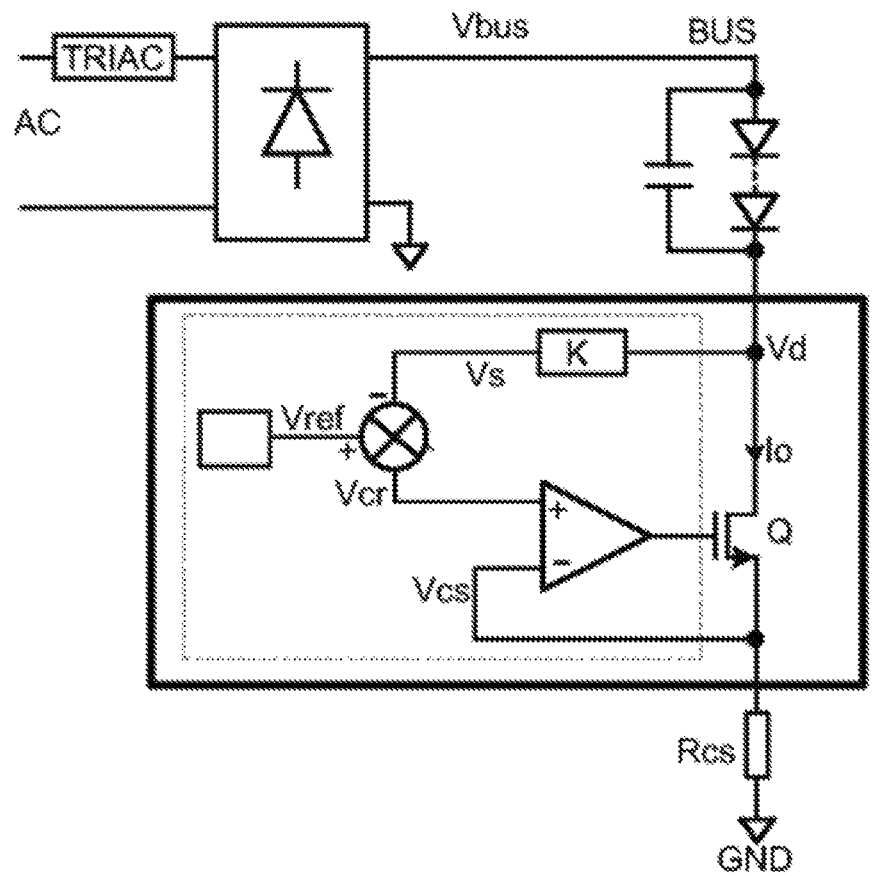
FIG. 1 shows a diagram of a conventional linear LED driving circuit.
Figure 2:
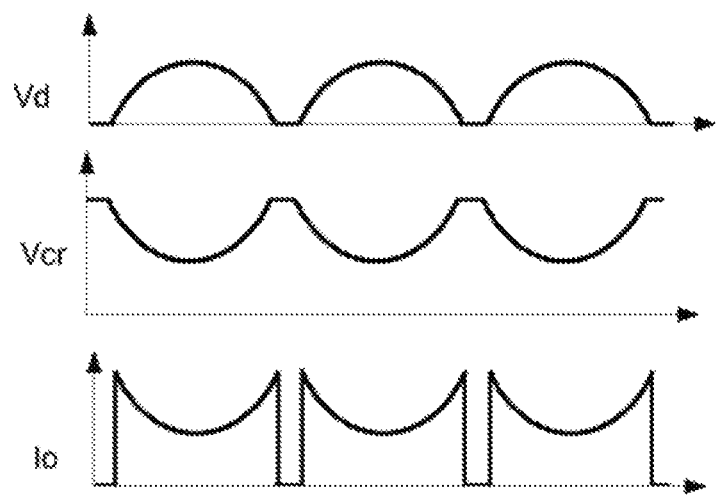
FIG. 2 illustrates a waveform diagram of signals generated by the linear LED driving circuit in FIG. 1.

A LED driving circuit includes a thyristor dimmer, a rectifier filter circuit, a LED lamp and a linear driving circuit as shown in FIG. 1. Wherein the linear driving circuit includes a transistor Q and a control circuit. The control circuit is configured to control the current flowing through the transistor. As shown in FIG. 2, when the DC bus voltage Vbus is high, the current signal Io flowing through the transistor Q is low. When the DC bus voltage Vbus is low, the current signal Io flowing through the transistor Q is high. Therefore, the power consumption of the linear LED driving circuit is low, and the system efficiency of the driving circuit is high, which effectively solves the problem of low efficiency of the linear LED driving circuit.

Figure 3:
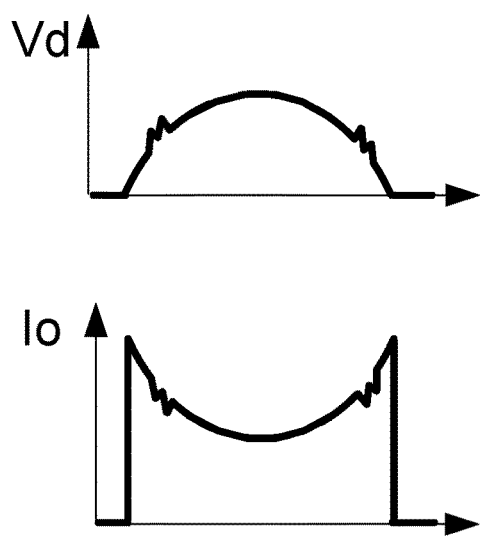
FIG. 3 illustrates a diagram of the voltage Vd and current Io being disturbed when the input voltage is disturbed.

The linear LED driving circuit has a weakness in suppressing the voltage disturbance from main power. FIG. 3 is a schematic diagram of the voltage Vd and current Io being disturbed when the input voltage is disturbed. When the input voltage is disturbed, the voltage Vd is also disturbed, which results in a disturbance in the current flowing through the LED lamp. As a direct result, the LED lamp will flash when the public power grid voltage is disturbed.

Accordingly, improved control circuit, driving circuit and control method for controlling a transistor is required to address one or more deficiencies in the above approaches.

The embodiments in accordance with the present invention provide a control circuit for controlling a transistor. The control circuit comprises a reference signal generating circuit and a driving circuit. The reference signal generating circuit is configured to output the reference signal, to control the reference signal having a first change trend in a first time period of a time interval, and having a second change trend in a second time period of the time interval based on time to eliminate the output current disturbance caused by the input voltage disturbance, wherein the second time period occurs after the first time period in the same time interval, and the first change trend is opposite to the second change trend. The driver stage circuit has a first input, a second input, and an output, the first input of the driver stage circuit is coupled to the reference signal generating circuit to receive the reference signal, the second input of the driver stage circuit is configured to receive a current sampling signal which represents the current flowing through the transistor, the output of the driver stage circuit is coupled to a control end of the transistor, the driver stage circuit is configured to control the transistor according to the reference signal and the current sampling signal, so that the current flowing through the transistor changes with the reference signal.

The embodiments in accordance with the present invention provide a driving circuit for driving a load. The driving circuit comprises a transistor and a control circuit for controlling the transistor, wherein the control circuit is coupled to a control end of the transistor to regulate the degree of conduction of the transistor.

Figure 4:
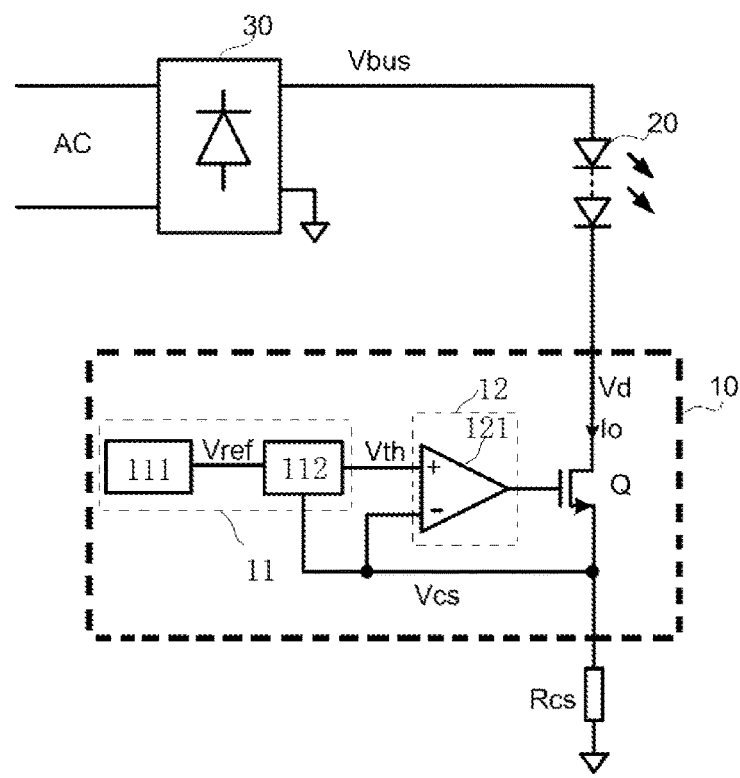
FIG. 4 illustrates a diagram of driving circuit according to an embodiment of the present invention.

FIG. 4 illustrates a diagram of driving circuit according to an embodiment of the present invention. As shown in FIG. 4, in an embodiment, the driving circuit 10 includes the transistor Q and the control circuit. The control circuit is coupled to the transistor Q in order to control the turn-on and turn-off of the transistor Q or control the conduction degree of the transistor Q. In a preferable embodiment, the transistor Q works at linear conduction state.

In an embodiment, the control circuit comprises the reference signal generating circuit 11 and the driver stage circuit 12. In an embodiment, the time interval is represented by T, and the reference signal is represented by the reference signal Vth.

In an embodiment, the reference signal generating circuit 11 further receives a detection signal. The reference signal generating circuit 11 is configured to obtain the time information based on the detection signal, and to ascertain the time interval according to the time information. In another embodiment, the time interval is determined by the starting point of the current time interval and the preset time interval length. Wherein, the reference signal generating circuit obtains the preset time interval length according to the starting point and the finishing point of the time interval, which are obtained by the detection signal of the previous cycle. In an embodiment, the cycle is the cycle of the bus voltage, that is, half of the public power grid frequency period.

In an embodiment, the detection signal received by the reference signal generating circuit 11 is a voltage sampling signal, which represents the terminal voltage of the transistor Q or the terminal voltage of a device which is coupled in series with the transistor. In another embodiment, the detection signal is the current sampling signal, that is, the current sampling signal representing the current flowing through the transistor.

As shown in FIG. 4, in another embodiment, the detection signal is a current sampling signal, such as a sampling voltage Vcs. The input of the second reference signal generating circuit 112 in the reference signal generating circuit 11 is coupled to the sampling resistor Rcs for obtaining the sampling voltage Vcs. The second reference signal generating circuit 112 obtains the time interval T by comparing the fixed threshold signal Vref and the sampling voltage Vcs. The time interval T is corresponding to the time interval when the sampling voltage Vcs is greater than the threshold signal Vref in the single cycle. In yet another embodiment, when the state transitions from Vcs less than Vref to Vcs greater than Vref, it is marked as the starting point of the time interval T, and the reference signal Vth is assigned the value by time according to a preset rule. When the state transitions from Vcs greater than Vref to Vcs less than Vref, it is marked as the finishing point of the time interval T, and it is obtained the length of the time interval when the sampling voltage Vcs is greater than the threshold signal Vref in the single cycle.

In an embodiment, the time interval length of the current cycle is used as the preset time interval length of the next cycle, and the reference signal generating circuit 112 generates an assignment rule for the reference signal of the next cycle based on the preset time interval length. In another embodiment, when the preset time interval length is T, it is compared the preset time interval length T with the bus voltage cycle T0 to obtain the assignment rule, that is, the reference signal Vth is assigned based on the difference between the preset time interval length T and the bus voltage cycle T0, so that the reference signal Vth can obtain an expected effect. In yet another embodiment, the expected effect includes making the reference signal Vth symmetrically distributed based on the midpoint of the bus voltage cycle. Preferably, the reference signal Vth is a symmetrical saddle-shaped distribution. By assigning the value to the reference signal Vth according to the time, a completely symmetrical saddle-shaped waveform in a cycle can be obtained, which can effectively avoid the asymmetrical waveform generated by the signal delay requirement in the prior art. Therefore, the embodiment of the present invention can acquire higher efficiency under the condition of outputting the same average current.

In an embodiment, the reference signal generating circuit 11 comprises the first reference signal generating circuit 111 and the second reference signal generating circuit 112. The first reference signal generating circuit 111 is configured to output the first reference signal. In another embodiment, the first reference signal generating circuit 111 outputs the threshold signal Vref which functions as the first reference signal. The threshold signal Vref can be a fixed reference voltage.

Figure 5:
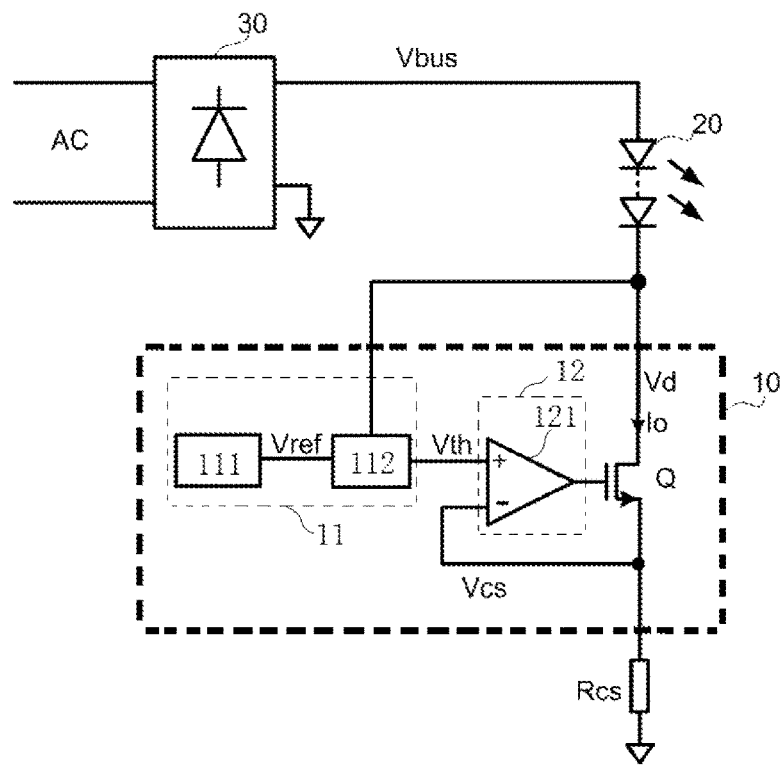
FIG. 5 illustrates a diagram of driving circuit according to an embodiment of the present invention.
Figure 7:
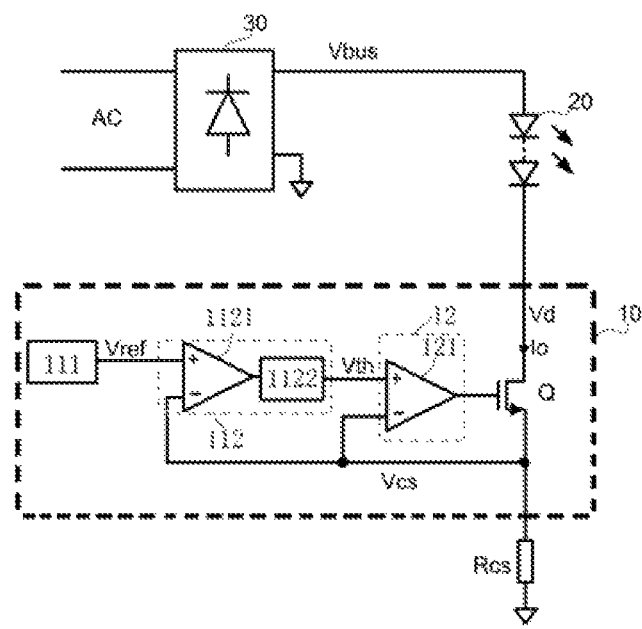
FIG. 7 illustrates a diagram of driving circuit according to an embodiment of the present invention.

In an embodiment, the second reference signal generating circuit 112 receives the threshold signal Vref and the detection signal. And the second reference signal generating circuit 112 is configured to output the reference signal Vth to the error amplifier circuit 121. The second reference signal generating circuit 112 compares the threshold signal Vref with the detection signal, such as Vd as shown in FIG. 5 or Vcs as shown in FIG. 7, to get the comparison result, and obtains the time interval T, during which the comparison result in a single cycle meets the set conditions. The second reference signal generating circuit divides the time interval T into at least two time periods. The second reference signal generating circuit is configured to control the reference signal Vth having a first change trend in the first time period of the time interval T, and to control the reference signal Vth having a second change trend in the second time period of the time interval T. In an embodiment, the first change trend is a decreasing trend, and the second change trend is an increasing trend. In another embodiment, the first change trend is an increasing trend, and the second change trend is a decreasing trend.

In an embodiment, the first time period of the time interval belongs to the first half period of the time interval, and the second time period of the time interval belongs to the second half period of the time interval.

In an embodiment, the first time period of the time interval includes all of the first half period and a part of the second half period of the time interval, and the second time period of the time interval includes another part of the second half period of the time interval. In another embodiment, the first time period of the time interval includes a part of the first half period of the time interval, and the second time period of the time interval includes another part of the first half period and all of the second half period of the time interval. In yet another embodiment, the first time period of the time interval includes the first half period, and the second time period of the time interval includes the second half period of the time interval T.

In an embodiment, the reference signal generating circuit 112 divides the time interval T into n parts to have n+1 time nodes (to-t4 referring to FIG. 6), where n is a natural number. Preferably, the n parts are equal parts, and n is an even number. The reference signal generating circuit 112 assigns values to the reference signal Vth at each time node so that the line type of the reference signal is a fold line or a curve. In the first time period of the time interval, the reference signal generating circuit controls the reference signal showing the first change trend such as decreasing trend. In the second time period of the time interval, the reference signal generating circuit 112 controls the reference signal Vth to show the second change trend such as increasing trend. Preferably, in a first half period of the time interval, the reference signal generating circuit 112 controls the reference signal showing the first change trend in sequence. In the second half period of the time interval, the reference signal generating circuit controls the reference signal to show the second change trend in sequence.

In an embodiment, the first change trend is a decreasing trend, and the second change trend is an increasing trend. In another embodiment, the first change trend is an increasing trend, and the second change trend is a decreasing trend. In the field of LED lamp driving, the first change trend can be selected as a decreasing trend, and the second change trend can be selected as an increasing trend. When the reverse phase equipment is connected to the end of the error amplifier circuit 121, the first change trend can be selected as an increasing trend, and the second change trend can be selected as a decreasing trend. A reverse phase circuit can convert the decreasing trend into the increasing trend, and convert the increasing trend into the decreasing trend.

In an embodiment, in the first half period of the time interval, the values of the reference signal at each time node decrease sequentially and the value differences of the reference signal between adjacent nodes decrease sequentially. And in the second half period of the time interval, the values of the reference signal at each time node increase sequentially and the value differences of the reference signal between adjacent nodes increase sequentially. The waveform of the reference signal Vth is saddle-shaped.

In an embodiment, the reference signal generating circuit controls the change trend of the reference signal Vth in the first half cycle and the change trend of the reference signal Vth in the second half cycle. The change trend of the reference signal Vth in the first half cycle is opposite to the change trend of the reference signal Vth in the second half cycle. And the reference signal Vth in the first half period and the second half period is symmetrical.

In an embodiment, the reference signal generating circuit is configured to control the reference signal to fall in the first half period of the time interval and to rise in the second half period of the time interval; and the waveform of Vth at the decreasing period and the waveform of Vth at the increasing period are symmetrical to each other.

Figure 6:
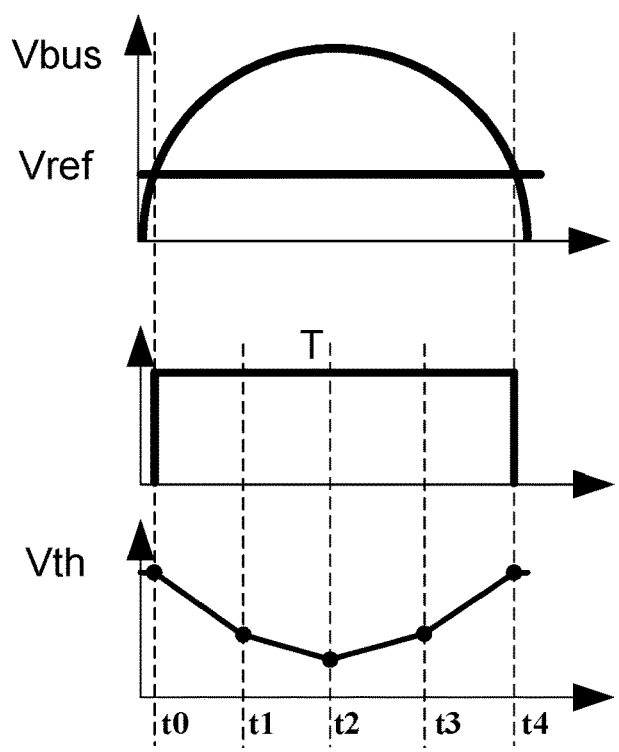
FIG. 6 illustrates a waveform diagram of signals generated by the driving circuit according to an embodiment of the present invention.

In another embodiment, the reference signal generating circuit divides the time interval T into n equal parts, where n is an even number. In the first half cycle, the values of the reference signal Vth in each 1/n time interval are controlled to show a decreasing trend. In the second half cycle, the values of the reference signal Vth in each 1/n time interval are controlled to show an increasing trend. In the case of the Vth value, it is controlled to ensure the slope of the initial segment and the end segment in the cycle is greater than the slope of the middle segment, so that the waveform of the Vth value is a saddle-shaped. Among the segments of the time interval T, the middle segment of the waveform of the Vth value has the lowest slope, and the two end segments have the highest slope. The slope of each segment gradually decreases from both end segments to the middle segment. As shown in FIG. 6, the change of the Vth value between each adjacent 1/n time interval can be a linear change or a non-linear change. When the value of n is larger, the curve of the current flowing through the transistor Q is smoother, meanwhile, the reference signal Vth with a saddle-shaped waveform controls the waveform of current flowing through the transistor Q to be a saddle-shaped curve. As a result, in an embodiment of the present invention, the power consumption of the transistor Q is reduced, and the linear LED driving circuit achieves a higher efficiency. But the larger the value of n is, the higher complexity of the system will be, which will increase the cost of the chip. In an embodiment, the value of n is equal to 4 or 6.

In an embodiment, as shown in FIG. 7, the second reference signal generating circuit 112 in the reference signal generating circuit 11 includes a comparator circuit 1121 and signal processing circuit 1122. The first input of the comparator circuit 1121 receives the detection signal, the second input of the comparator circuit 1121 receives the threshold signal Vref. The output of the comparator circuit 1121 provides a status signal to the signal processing circuit 1122. The reference signal generating circuit 11 obtains the time interval based on the status signal. When Vcs is less than Vref, the status signal outputted by the comparator circuit is the first state such as the low level (logic Low). When Vcs is greater than Vref, the status signal outputted by the comparator circuit is the second state such as the high level (logic High). In another embodiment, when the status signal changes from the first state to the second state (such as from low level to high level), the starting point of the time interval is determined, and when the status signal changes from the second state to the first state, the finishing point of the time interval is determined, that is, the time interval T is obtained by detecting the time length that the sampling voltage Vcs is greater than the threshold voltage Vref in a single cycle period of the detection signal sampling voltage Vcs. The length of the time interval T can also be determined by preset time interval for the next cycle or the next few cycles, and further is used to generate the reference signal Vth. As it should be, the preset time interval length used to generate the reference signal Vth can be acquired by other algorithms, such as storing the length values of the time interval in the previous several cycles, and calculating the average value of these length values of the time interval to obtain the preset time interval length of the time interval in the current cycle. The signal processing circuit 1122 provides the reference signal Vth based on the status signal provided by the comparator circuit 1121 and time. The signal processing circuit 1122 has a predetermined assignment rule for determining the reference signal Vth. The value of the reference signal Vth is assigned and determined based on the predetermined assignment rule and time calculating from the beginning of the current time interval. In another embodiment, the signal processing circuit 1122 determines the current time interval based on the status signal outputted by the comparator circuit 1121, that is, the current time interval is the interval that the detection signal Vcs is greater than Vref, the value of the reference signal Vth is assigned by time from the beginning of the current time interval based on the assignment rule. In yet another embodiment, the value of the reference signal Vth in the time interval T is determined as shown in FIG. 6.

In an embodiment, the driver stage circuit 12 includes an error amplifier circuit 121. The first input of the error amplifier circuit 121 couples to receive the detection signal Vcs. The second input of the error amplifier circuit 121 couples to receive the reference signal Vth. The output of the error amplifier circuit 121 couples to the control end of the transistor Q to control the current flowing through the transistor Q. As the control result, the current flowing through the transistor Q changes with the waveform of the reference signal Vth.

In an embodiment, the specific process of the driving circuit used to drive the load is: the second reference signal generating circuit 112 obtains the fixed threshold signal Vref and the sampling voltage Vcs. obtaining the time interval T by comparing the fixed threshold signal Vref and the sampling voltage Vcs, the time interval T is corresponding to the time interval when the sampling voltage Vcs is greater than the threshold signal Vref in the single cycle, the time interval is divided into n equal parts, wherein n is an even number. Assigning the value to the reference signal Vth at each 1/n time point, the assignment rule is as follows: in the first half cycle, the Vth value of the reference signal in each 1/n time interval is controlled to show a decreasing trend in turn; in the second half cycle, the Vth value of the reference signal in each 1/n time interval is controlled to show an increasing trend in turn. In the first half cycle, as the reference signal Vth decreases, the error amplifier circuit 121 outputs a low-level signal, which controls the transistor Q to increase the resistance value for reducing the current Io. In the second half cycle, as the reference signal Vth increases, the error amplifier circuit 121 outputs a high-level signal, which controls the transistor Q to be turned on for raising the current flowing though the transistor.

In an embodiment, as the direct current bus voltage Vbus inputted in the form of the steamed bread wave, the value of the reference signal Vth outputted by the second reference signal generating circuit 112 changes according to the assignment rule when the sampled voltage Vcs is greater than the fixed threshold signal Vref. The sampling voltage Vcs is determined by the resistor Rcs and the current flowing through the resistor.

In an embodiment, a waveform of the saddle-shaped current can be obtained, and the linear LED driving circuit can achieve higher efficiency. Meanwhile, the current waveform does not change in real time with the input voltage or the direct current bus voltage Vbus, but assigns the reference signal Vth at each 1/n time point, which can effectively solve the LED flicker caused by the grid voltage disturbance.

In an embodiment, the assignment rule of the reference signal Vth is as follows, when n is equal to 4, the time nodes from the starting point to the finishing point are t0, t1, t2, t3 and t4. The assignment value of the reference signal Vth at each time point can be selected as: t0=a, t1=a−b, t2=a−c, t3=a−b, t4=a; wherein a≥c>b>0.

Preferably, in the first half period, the decreasing amplitude of the Vth value of the reference signal in each 1/n time interval decreases sequentially; in the second half period, the rising amplitude of the Vth value of the reference signal in each 1/n time interval increases sequentially. Such as, when n is equal to 4, |a−(a−b)|>|(a−b)−(a−c)|. It is controlled that the slope of the starting segment and the finishing segment in the cycle are greater than the slope of the middle segment for obtaining a saddle-shape Vth waveform FIG. 5 is a schematic circuit diagram of the driving circuit in another embodiment of the present invention. As shown in FIG. 5, in an embodiment, the detection signal is the drain voltage Vd of the transistor Q controlled by the control circuit. The input of the second reference signal generating circuit couples to the drain electrode of the transistor Q. The difference from the implementation shown in FIG. 4 is that the drain electrode of the transistor Q couples to the input of the second reference signal generating circuit 112. It is obtained the time interval T by comparing the drain voltage Vd with the fixed threshold signal Vref. The time interval T is corresponding to the time interval when the drain voltage Vd is greater than the threshold signal Vref in the single cycle. The time interval T is divided into n equal parts, wherein n is an even number. And the reference signal Vth is assigned values as described in other embodiments above.

As shown in FIG. 4 and FIG. 5, in an embodiment, the driving circuit further includes the rectifier circuit 30, and the rectifier circuit 30 couples to the positive electrode of the LED lamp 20. The control circuit couples to the negative electrode of the LED lamp 20.

In an embodiment, the output of the error amplifier circuit 121 couples to the grid electrode of the transistor Q. The negative electrode of the LED lamp couples to the drain electrode of the transistor Q.

In an embodiment, in the first time period of the time interval T, the error amplifier circuit 121 outputs a low-level signal when the reference signal Vth is less than the detection signal Vcs, which controls the transistor Q to increase the resistance value for reducing the current Io. In the second time period of the time interval T, the error amplifier circuit 121 outputs a high-level signal when the reference signal Vth is greater than the detection signal Vcs, which controls the transistor Q to decrease the resistance value for raising the current Io.

The embodiments in accordance with the present invention provide a control method for controlling a transistor. The control method includes: (i) an output control step of a reference signal: controlling a reference signal with a first change trend in a first time period of a time interval, and controlling the reference signal with a second change trend in a second time period of the time interval, wherein the second time period occurs after the first time period in the same time interval, and the first change trend is opposite to the second change trend; and (ii) a control step of the transistor: controlling the transistor according to the reference signal and a current sampling signal, so that the current flowing through the transistor changes with the reference signal.

In another embodiment, the control method further comprises: determining the time interval for a next cycle according to the conduction state of the transistor.

In an embodiment, the method for determining the time interval comprises: comparing a detection signal with a threshold signal to get a comparison result; and obtaining a starting point and a finishing point of the time interval based on the comparison result.

In an embodiment, the output control step of the reference signal comprises: dividing the time interval into n equal parts, where n is an even number; assigning values to the reference signal of each time node so that the line type of the reference signal is a fold line or a curve; and controlling the values of the reference signal in each 1/n time interval of the first half period of the time interval decreasing sequentially and the value differences of the reference signal between adjacent nodes decreasing sequentially; and controlling the values of the reference signal in each 1/n time interval of the second half period of the time interval increasing sequentially and the value differences of the reference signal between adjacent nodes increasing sequentially.

In an embodiment, the control method further comprises: controlling the reference signal to be symmetrical within the time interval.

In an embodiment, preferably, n is equal to 4 or 6.

In summary, the control circuit, driving circuit and control method for controlling the transistor proposed by the present invention can effectively solve the abnormalities of the user devices caused by power grid voltage disturbances.

The waveform of the saddle-shaped current can be obtained based on the present invention, and when the present invention is applied to the field of the LED lamp driving, the linear LED driving circuit can achieve higher efficiency. Meanwhile, the waveform of the current flowing through the LED lamp does not change in real time with the input voltage or the direct current bus voltage Vbus, but changes with the reference signal Vth, which can effectively solve the LED flicker caused by the grid voltage disturbance.

It will be appreciated by persons skilled in the art that the present invention is not limited to what has been particularly shown and described herein above. Rather the scope of the present invention is defined by the claims and includes both combinations and sub-combinations of the various features described herein above as well as variations and modifications thereof which would occur to persons skilled in the art upon reading the foregoing description and which are not in the prior art.

I claim:

1. A control circuit for controlling a transistor, comprising:
   a reference signal generating circuit configured to output a reference signal, the reference signal generating circuit configured to control the reference signal having a first change trend in a first time period of a time interval and having a second change trend in a second time period of the time interval based on time, wherein the second time period occurs after the first time period in the same time interval, and the first change trend is opposite to the second change trend; and
   a driver stage circuit, having a first input, a second input, and an output, the first input of the driver stage circuit coupled to the reference signal generating circuit to receive the reference signal, the second input of the driver stage circuit configured to receive a current sampling signal representing the current flowing through the transistor, the output of the driver stage circuit coupled to a control end of the transistor, the driver stage circuit configured to control the transistor according to the reference signal and the current sampling signal, so that the current flowing through the transistor changes with the reference signal.

2. The control circuit of claim 1, wherein the reference signal generating circuit is further configured to receive a detection signal and to determine the time interval according to the detection signal.

3. The control circuit of claim 2, wherein the reference signal generating circuit comprises a comparator circuit and a signal processing circuit, wherein a first input of the comparator circuit is configured to receive the detection signal, a second input of the comparator circuit is configured to receive a threshold signal, and an output of the comparator circuit is configured to output a status signal, and wherein the reference signal generating circuit is configured to obtain the time interval according to the status signal, and wherein the signal processing circuit generates the reference signal based on the status signal and time.

4. The control circuit of claim 3, wherein the reference signal generating circuit is configured to obtain a starting point of the time interval when the status signal changes from a first state to a second state, and to obtain a finishing point of the time interval when the status signal changes from the second state to the first state.

5. The control circuit of claim 3, wherein the detection signal is a voltage sampling signal representing a terminal voltage of the transistor or a terminal voltage of a device which coupled in series with the transistor.

6. The control circuit of claim 3, wherein the detection signal is the current sampling signal.

7. The control circuit of claim 1, wherein the first time period of the time interval belongs to a first half period of the time interval, and the second time period of the time interval belongs to a second half period of the time interval.

8. The control circuit of claim 1, wherein the first time period of the time interval includes all of the first half period and a part of the second half period of the time interval, and the second time period of the time interval includes another part of the second half period of the time interval; or
wherein the first time period of the time interval includes a part of the first half period of the time interval, and the second time period of the time interval includes another part of the first half period and all of the second half period of the time interval.

9. The control circuit of claim 1, wherein the reference signal generating circuit divides the time interval into n parts to have n+1 time nodes, where n is a natural number, and assigns values to the reference signal at each time node so that the line type of the reference signal is a fold line or a curve; and wherein the reference signal generating circuit controls the reference signal having the first change trend in the first time period, and the reference signal generating circuit controls the reference signal having the second change trend in the second time period.

10. The control circuit of claim 9, wherein the first change trend is a decreasing trend, and the second change trend is an increasing trend.

11. The control circuit of claim 9, wherein the values of the reference signal at each time node decrease sequentially and the value differences of the reference signal between adjacent time nodes decrease sequentially in the first half period of the time interval; and wherein the values of the reference signal at each time node increase sequentially and the value differences of the reference signal between adjacent time nodes increase sequentially in the second half period of the time interval.

12. The control circuit of claim 1, wherein the reference signal generating circuit controls the reference signal to decrease in the first half period of the time interval and to increase in the second half period of the time interval; and wherein the waveform of the reference signal in the decreasing period is symmetrical to the waveform of the reference signal in the increasing period.

13. A driving circuit for driving a load, comprising a transistor and a control circuit for controlling the transistor, wherein the control circuit coupled to a control end of the transistor to regulate the degree of conduction of the transistor; and the control circuit further comprises:
a reference signal generating circuit configured to output a reference signal, the reference signal generating circuit configured to control the reference signal having a first change trend in a first time period of a time interval and having a second change trend in a second time period of the time interval based on time, wherein the second time period occurs after the first time period in the same time interval, and the first change trend is opposite to the second change trend; and
a driver stage circuit, having a first input, a second input, and an output, the first input of the driver stage circuit coupled to the reference signal generating circuit to receive the reference signal, the second input of the driver stage circuit configured to receive a current sampling signal representing the current flowing through the transistor, the output of the driver stage circuit coupled to a control end of the transistor, the driver stage circuit configured to control the transistor according to the reference signal and the current sampling signal, so that the current flowing through the transistor changes with the reference signal.

14. A control method for controlling a transistor, comprising:
controlling the reference signal having a first change trend in a first time period of a time interval, and controlling the reference signal having a second change trend in a second time period of the time interval, wherein the second time period occurs after the first time period in the same time interval, and the first change trend is opposite to the second change trend; and
controlling the transistor according to the reference signal and a current sampling signal, so that the current flowing through the transistor changes with the reference signal.

15. The control method of claim 14, wherein the control method further comprises: determining the time interval for a next cycle according to the conduction state of the transistor.

16. The control method of claim 14, wherein the method for determining the time interval comprises: comparing a detection signal with a threshold signal to get a comparison result; and obtaining a starting point and a finishing point of the time interval based on the comparison result.

17. The control method of claim 14, wherein controlling the reference signal comprises:
dividing the time interval into n equal parts to have n+1 time nodes, where n is an even number;
assigning values to the reference signal at each time node so that the line type of the reference signal is a fold line or a curve; and
controlling the values of the reference signal in the first half period of the time interval decreasing sequentially and the value differences of the reference signal between adjacent time nodes decreasing sequentially; and controlling the values of the reference signal in the second half period of the time interval increasing sequentially and the value differences of the reference signal between adjacent time nodes increasing sequentially.

18. The control method of claim 14, wherein the control method further comprises: controlling the reference signal to be symmetrical within the time interval.

19. The control method of claim 17, wherein n is equal to 4 or 6.

* * * * *